United States Patent
Anderton et al.

(10) Patent No.: US 9,307,318 B2
(45) Date of Patent: Apr. 5, 2016

(54) AUDIO PROCESSOR CIRCUITS FOR ACOUSTIC ECHO CANCELLATION AND METHOD THEREFOR

(71) Applicants: David O. Anderton, Austin, TX (US); Kevin Hung, Austin, TX (US); Dana Taipale, Austin, TX (US)

(72) Inventors: David O. Anderton, Austin, TX (US); Kevin Hung, Austin, TX (US); Dana Taipale, Austin, TX (US)

(73) Assignee: SILICON LABORATORIES INC., Austin, TX (US)

(*) Notice: Subject to any disclaimer, the term of this patent is extended or adjusted under 35 U.S.C. 154(b) by 360 days.

(21) Appl. No.: 13/788,471

(22) Filed: Mar. 7, 2013

(65) Prior Publication Data

US 2014/0254813 A1    Sep. 11, 2014

(51) Int. Cl.
| H04B 3/20 | (2006.01) |
| H04M 9/08 | (2006.01) |
| H04R 3/02 | (2006.01) |
| H04B 3/23 | (2006.01) |

(52) U.S. Cl.
CPC .. *H04R 3/02* (2013.01); *H04B 3/23* (2013.01); *H04M 9/082* (2013.01)

(58) Field of Classification Search
None
See application file for complete search history.

(56) References Cited

U.S. PATENT DOCUMENTS

| 5,410,595 | A | 4/1995 | Park et al. |
| 7,027,591 | B2* | 4/2006 | Cairns ...................... 379/406.05 |
| 7,233,659 | B1* | 6/2007 | Davis et al. ............... 379/388.03 |
| 2005/0099967 | A1* | 5/2005 | Baba ............................ 370/286 |
| 2009/0185674 | A1* | 7/2009 | Sorensen et al. .......... 379/406.01 |
| 2010/0202634 | A1* | 8/2010 | Wu ................................ 381/111 |
| 2010/0226492 | A1* | 9/2010 | Takada ..................... 379/406.08 |
| 2015/0189092 | A1* | 7/2015 | Thapa et al. ........... H04M 3/568 |

* cited by examiner

*Primary Examiner* — Andrew L Sniezek
(74) *Attorney, Agent, or Firm* — Polansky & Associates, P.L.L.C.; Paul J. Polansky (57) ABSTRACT

In one form, an audio processor circuit includes a first digital signal processing circuit, a second digital signal processing circuit, and an interleaver. The first digital signal processing circuit has an input for receiving a far-end audio signal, and an output. The second digital signal processing circuit has an input for receiving a digital near-end audio signal, and an output. The interleaver has a first input coupled to the output of the first digital signal processing circuit, a second input coupled to the output of the second digital signal processing circuit, and an output for alternatively providing signals received from the first and second inputs to the output.

26 Claims, 6 Drawing Sheets

AUDIO PROCESSOR CIRCUITS FOR ACOUSTIC ECHO CANCELLATION AND METHOD THEREFOR

FIELD OF THE DISCLOSURE

The present disclosure relates generally to an audio processor circuit and, more particularly to audio processor circuits for acoustic echo cancellation of audio signals such as speech signals.

BACKGROUND

For products that communicate audio signals from one location to another location, for example, a full-duplex speakerphone, some of the acoustic energy from the far-end voice signal will transfer into the microphone that picks up the near-end voice signal. If a fraction of the far-end voice energy transfers into the near-end speech path, a person on the far end of the call will hear their own voice returned as an annoying echo.

A speakerphone includes a microphone and a loudspeaker physically located within a room and each connected to a speakerphone signal processor. The speakerphone encounters two types of echo. The first type, known as electrical echo, is generated by the interfaces formed by various connectors of the speakerphone system (especially at the transmission line coupler (TLC)). A second type of echo is acoustic echo. Acoustic echo is generated by the room acoustics as the sound echoes off physical objects such as walls. Acoustic echo differs from electrical echo in that there are multiple echo paths. The "first attack" echo path represents the shortest distance from the loudspeaker to the microphone. Acoustic echo also differs from electrical echo because its duration is much longer. Depending on such factors as room size and building materials, an acoustic echo may not dissipate for several milliseconds. Thus, the implementation of an audio processor circuit that provides effective acoustic echo cancellation presents significant challenges. These challenges are even more complicated to address due to the inherent transit delay if the remote processor is a significant distance away from the signal conversion function.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

Figure 1:
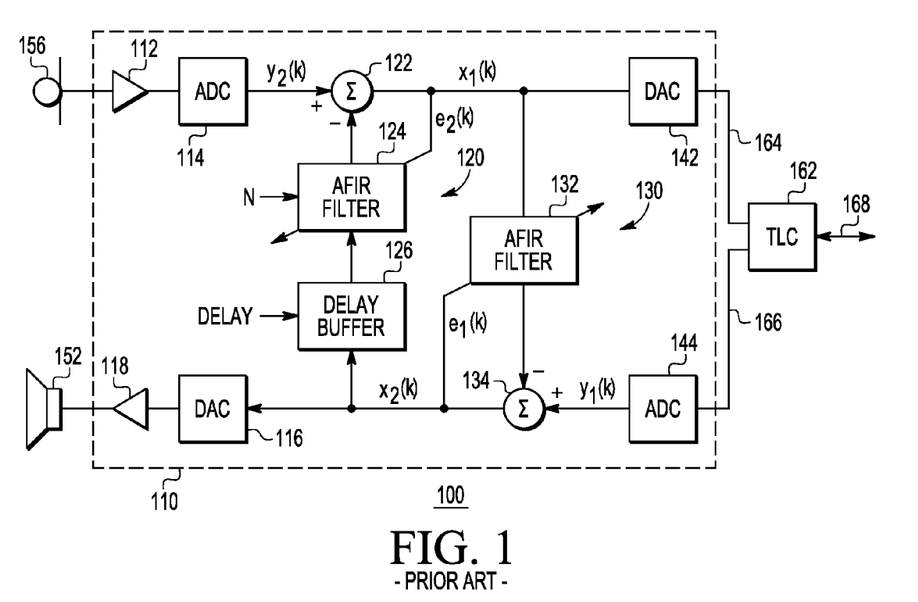
FIG. 1 illustrates in partial block diagram and partial schematic form an audio processor system known in the prior art.

FIG. 1 illustrates in partial block diagram and partial schematic form an audio processor system 100 known in the prior art. Audio processor system 100 generally includes an audio processor circuit 110, a loudspeaker 152, a microphone 156, a transmission line coupler ("TLC") circuit 162, an interface 164, an interface 166, and a two-wire transmission line 168.

Audio processor circuit 110 includes an amplifier 112, an analog-to-digital converter (ADC) 114, a digital-to-analog converter (DAC) 116, an amplifier 118, an acoustic echo canceller 120, an electrical echo canceller 130, a digital-to-analog converter 142, and an analog-to-digital converter 144. Amplifier 112 has an input and an output to provide an amplified analog speech signal. Analog-to-digital converter 114 has an input connected to the output of amplifier 112 and an output to provide a signal labeled "$y_2(k)$". Digital-to-analog converter 116 has an input to receive a signal labeled "$x_2(k)$", and an output. Amplifier 118 has an input connected to the output of digital-to-analog converter 116, and an output to provide an amplified analog speech signal.

Acoustic echo canceller 120 includes a summing device ("Σ") 122, an adaptive FIR ("AFIR") filter 124, and a delay buffer 126. Summing device 122 has a positive input ("+") to receive signal $y_2(k)$, a negative input ("−"), and an output to provide a signal labeled "$x_1(k)$". Adaptive FIR filter 124 has a first input to receive a signal labeled "N", a second input connected to the output of summing device 122 to receive an error signal labeled "$e_2(k)$" (which is that same signal as $x_1(k)$), a third input, and an output connected to the negative input of summing device 122. Delay buffer 126 has a first input to receive a signal labeled "DELAY", a second input to receive signal $x_2(k)$, and an output connected to the third input of adaptive FIR filter 124.

Electrical echo canceller 130 includes an adaptive FIR filter 132, and a summing device 134. Adaptive FIR filter 132 has a first input to receive an error signal labeled "$e_1(k)$" (which is the same signal as $x_2(k)$), a second input connected to the output of summing device 122 to receive signal $x_1(k)$, and an output. Summing device 134 has a negative input connected to the output of adaptive FIR filter 132, a positive input to receive a digital speech signal labeled "$y_1(k)$", and an output to provide signal $x_2(k)$.

Digital-to-analog converter 142 has an input connected to the output of summing device 122 to receive signal $x_1(k)$, and an output to provide an analog speech signal. Analog-to-digital converter 144 has an input to receive an analog speech signal, and an output to provide the signal $y_1(k)$.

Loudspeaker 152 has an input connected to the output of amplifier 118 to receive the amplified analog speech signal, and provides sound in response to its input. Microphone 156 has an output connected to the input of amplifier 112 to provide an analog speech signal in response to received sound.

TLC 162 has an input connected to the output of digital-to-analog converter 142 to receive the analog speech signal over interface 164, an output to provide an analog speech signal over interface 166, and is bidirectionally connected to another TLC (not shown) over two-wire transmission line 168.

In operation, the interfaces of a far-end TLC and interfaces 164 and 166 of near-end TLC 162 cause electrical echoes in audio processor system 100. Electrical echo canceller 130 is an implementation of a circuit to cancel these electrical echoes. Also, room acoustics and physical objects, for example, walls within the room, contribute to variability in acoustic echoes. Acoustic echo canceller 120 is an implementation of a circuit to adaptively cancel these acoustic echoes. For example, acoustic echo canceller 120 cancels acoustic echoes that include a first attack path echo.

Acoustic echo canceller 120 provides signal $e_2(k)$ at the output terminal of summing device 122 based on:

$$e_2(k)=y_2(k)-H^T(k)X_2(k); \quad [1]$$

where $H(k)$ is an N-element vector consisting of adaptive FIR filter 124 coefficients expressed at time k, T denotes the matrix transpose, and $X_2(k)$ is an N-element input data vector.

Acoustic echo canceller 120 predicts the echo signal as a linear combination of the signal contents of acoustic echo canceller 120. In particular, audio processor system 100 updates coefficients of acoustic echo canceller 120 every sample period to reduce signal $e_2(k)$ according to a least-mean-squares (LMS) algorithm that is based on a loop gain convergence parameter. Audio processor system 100 uses the LMS algorithm to drive the $e_2(k)$ towards zero. As $e_2(k)$ is lowered, the adaptive filter impulse response converges towards the impulse response of the echo path.

By providing an acoustic echo canceller, audio processor system 100 cancels some of the acoustic echoes. However, audio processor system 100 has certain deficiencies. For example, audio processor system 100 does not make timely coefficient adjustments of adaptive FIR filter 124 for:
1. Buffer and transfer delay injected in the speech path after summing device 134 provides signal $x_2(k)$ to delay buffer 126;
2. ADC 114 and DAC 116 processing the speech signal (for example, performing equalization and volume control) after summing device 134 provides signal $x_2(k)$ to delay buffer 126;
3. ADC 114 injecting additional delay in the $y_2(k)$ signal before providing the $y_2(k)$ signal to summing device 122;
4. Volume or automatic gain control (AGC) changes causing instant mis-tuning of acoustic echo canceller 120; and
5. Synchronization problems between the $y_2(k)$ signal and signal $x_2(k)$ in acoustic echo canceller 120.

Figure 2:
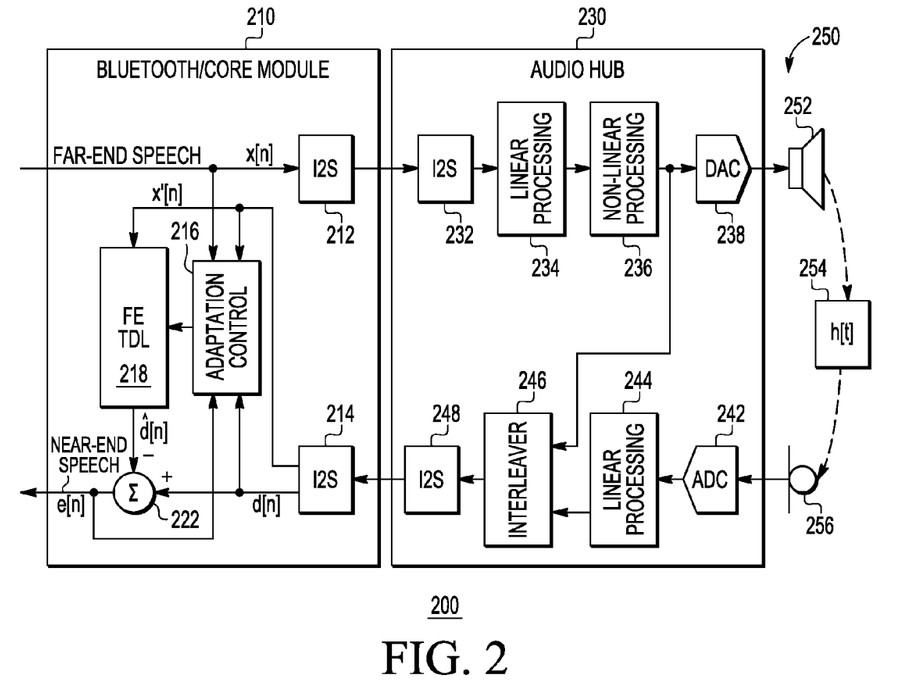
FIG. 2 illustrates in partial block diagram and partial schematic form an audio processor system according to one embodiment.

FIG. 2 illustrates in partial block diagram and partial schematic form an audio processor system 200 according to one embodiment. Audio processor system 200 generally includes a Bluetooth/Core module 210, an integrated circuit audio hub 230, and a set of electroacoustic transducers 250. As shown in FIG. 2, integrated circuit audio hub 230 is a single chip but in other embodiments it could be implemented by software or firmware running on a data processor and with one or more off-chip components. In another embodiment, Bluetooth/Core module 210 could be, for example, a head-unit processor, a central processor, or any remote data processor, for example, a central processing unit (CPU) core of a television system performing voice over Internet Protocol (IP) services.

Bluetooth/Core module 210 includes a serial interface circuit 212, a serial interface circuit 214, an adaptation control block 216, a tapped delay line (TDL) 218 labeled "FE TDL", and a summing device 222. Serial interface circuit 212 has an input to receive a far end audio signal, for example, a signal labeled "FAR-END SPEECH" expressed mathematically as "x[n]", and an output. In one embodiment, the output of serial interface circuit 212 is connected to at least one external output terminal. Serial interface circuit 214 has an input, a first output to provide a signal labeled "x'[n]", and a second output to provide a signal labeled "d[n]". In one embodiment, the input of serial interface circuit 214 is connected to at least one external input terminal. Adaptation control block 216 has a first input to receive signal x[n], a second input connected to the first output of serial interface circuit 214 to receive signal x'[n], a third input to receive an error signal labeled "e[n]", a fourth input connected to the second output of serial interface circuit 214 to receive signal d[n], and an output. Tapped delay line 218 has a first input connected to the output of adaptation control block 216, a second input connected to the first output of serial interface circuit 214 to receive signal x'[n], and an output to provide an estimated echo signal labeled "d̂[n]". Summing device 222 has a negative input connected to the output of tapped delay line 218 to receive signal d̂[n], a positive input connected to the second output of serial interface circuit 214 to receive signal d[n], and an output to provide a signal labeled "NEAR-END SPEECH" that is the same as error signal e[n] and that represents a difference between signal d[n] and signal d̂[n].

Integrated circuit audio hub 230 includes a serial interface circuit 232, a digital signal processing circuit 234 labeled "LINEAR PROCESSING", a digital signal processing circuit 236 labeled "NON-LINEAR PROCESSING", a digital-to-analog converter 238, an analog-to-digital converter 242, a digital signal processing circuit 244 labeled "LINEAR PROCESSING", an interleaver 246, and a serial interface circuit 248. Serial interface circuit 232 has an input connected to the output of serial interface circuit 212, and an output. In one embodiment, the input of serial interface circuit 232 is connected to at least one external input terminal. Digital signal processing circuit 234 has an input connected to the output of serial interface circuit 232, and an output. Digital signal processing circuit 236 has an input connected to the output of digital signal processing circuit 234, and an output. Digital-to-analog converter 238 has an input connected to the output of digital signal processing circuit 236, and an output to provide an analog speech signal. Analog-to-digital converter 242 has an input to receive a speech signal and an output. Digital signal processing circuit 244 has an input connected to the output of analog-to-digital converter 242, and an output. Interleaver 246 has a first input connected to the output of digital signal processing circuit 236, a second input connected to the output of digital signal processing circuit 244, and an output to alternatively provide signals received from the first and second inputs. Serial interface circuit 248 has an input connected to the output of interleaver 246, and an output connected to the input of serial interface circuit 214. In one embodiment, the output of serial interface circuit 248 is connected to at least one external output terminal.

The set of electroacoustic transducers 250 includes a loudspeaker 252, a "symbolic" acoustic echo path 254 having a transfer function labeled "h[t]", and a microphone 256. Loudspeaker 252 has an input connected to the output of digital-to-analog converter 238, and an output to provide sound in response to its input. Acoustic echo path 254 represents the transfer function between loudspeaker 252 and microphone 256 and is shown in FIG. 2 as a block having an input connected to the output of loudspeaker 252, and an output. Microphone 256 has an input connected to the output of acoustic echo path 254 and an output connected to the input of analog-to-digital converter 242.

In operation, audio processor system 200 is partitioned into two main components, Bluetooth/Core module 210 and integrated circuit audio hub 230. Integrated circuit audio hub 230 provides a return path for the far-end signal after all signal processing for use in the acoustic echo canceller in Bluetooth/Core module 210. Integrated circuit audio hub 230 includes interleaver 246 to provide left and right channels of a stereo signal. According to one aspect of audio processing system, integrated circuit audio hub 230 uses interleaver 246 to output the delayed far-end signal by multiplexing the delayed far-end signal with the near-end signal, e.g., by using the left time slot for the delayed far-end signal and the right time slot for the near-end signal. These interleaved signals are returned to Bluetooth/Core module 210 over an inter-chip digital link. In the illustrated embodiment, the inter-chip digital link and serial interface circuits are compatible with the 12 S standard, but in other embodiments any other suitable digital link may be used.

The AEC in Bluetooth/Core module 210 feeds the tapped delay line with the delayed far-end signal x'[n] in lieu of the original far-end signal x[n] transmitted to the audio hub. Note that integrated circuit audio hub 230 feeds delayed far-end signal x'[n] to the return path from the input of DAC 238.

Thus the acoustic echo canceller in Bluetooth/Core module 210 uses the returned version of the far-end speech signal, i.e. x'[n], instead of the original far-end signal x'[n] transmitted to integrated circuit audio hub 230. Notice that adaptation control 216 has access to both the transmitted far-end signal and the returned far-end signal. Since there is an inherent and unavoidable delay between the two signals, the adaptation control 216 can use x[n] as a look-ahead signal to detect the presence of far-end speech since x[n] leads x'[n], which can help prevent mis-tuning for end of speech events.

Figure 3:
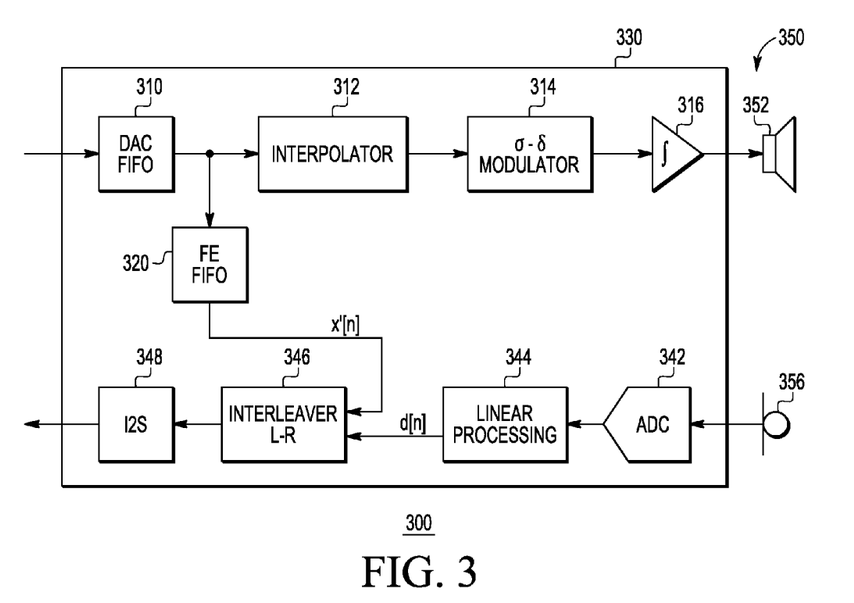
FIG. 3 illustrates in partial block diagram and partial schematic form a portion of the integrated circuit audio hub of FIG. 2 according to one embodiment.

FIG. 3 illustrates in partial block diagram and partial schematic form an integrated circuit audio hub 330 that may be used to implement a portion of integrated circuit audio hub 230 of FIG. 2 according to one embodiment. FIG. 3 shows integrated circuit audio hub 330 in the context of an audio processor system 300 that includes a set of electroacoustic transducers 350.

Integrated circuit audio hub 330 includes a FIFO buffer 310 labeled "DAC FIFO" that forms a last stage of digital processing circuits 234 and 236, an interpolator 312, a delta-sigma ("σ-δ") modulator 314, a filter ("∫") 316, a delay buffer 320 labeled "FE FIFO", an analog-to-digital converter 342, a digital signal processing circuit 344 labeled "LINEAR PROCESSING", an interleaver 346 labeled "INTERLEAVER L-R", and a serial interface circuit 348. In the illustrated embodiment, the inter-chip digital link and serial interface circuit 348 is compatible with the 12 S standard, but in other embodiments any other suitable digital link may be used. FIFO buffer 310 has an input connected to the output of digital signal processing circuit 236 (see FIG. 2), and an output. Interpolator 312 has an input connected to the output of FIFO buffer 310, and an output. Delta-sigma modulator 314 has an input connected to the output of interpolator 312 and an output. Filter 316 has an input connected to the output of delta-sigma modulator 314 and an output to provide an analog speech signal. Delay buffer 320 has an input connected to the output of FIFO buffer 310 and an output to provide the delayed signal x'[n]. Analog-to-digital converter 342 has an input to receive a near-end speech signal and an output to provide a digital near-end speech signal. Digital signal processing circuit 344 has an input connected to the output of analog-to-digital converter 342 to receive the digital near-end speech signal, and an output. Interleaver 346 has a first input connected to the output of delay buffer 320 to receive signal x'[n], a second input connected to the output of digital signal processing circuit 344 to receive the signal d[n], and an output port to alternatively provide signals received from the first and second inputs. Serial interface circuit 348 has an input connected to the output of interleaver 346, and an output. In one embodiment, the output of serial interface circuit 348 is connected to at least one external output terminal.

The set of electroacoustic transducers 350 includes a loudspeaker 352 and a microphone 356. Loudspeaker 352 has an input connected to the output of filter 316 to receive the analog speech signal, and provides sound in response to its input. Microphone 356 has an output connected to the input of analog-to-digital converter 342 in response to received sound.

In operation, integrated circuit audio hub 330 implements DAC 238 as an oversampled converter including interpolator 312, σ-δ modulator 314, and filter 316. Return FIFO 320 is connected to the output of DAC FIFO 310 to account for as much of the signal processing delay through integrated circuit audio hub 330 as possible. Moreover, delay buffer 320 has a delay approximately equal to a sum of a path delay through digital-to-analog converter 238 (interpolator 312, delta-sigma modulator 314, and filter 316), an acoustic echo path delay, a path delay analog-to-digital converter 342, and a path delay through digital signal processing circuit 344.

Integrated circuit audio processor 330 taps off the far-end speech signal at the DAC as each datum is read from DAC FIFO 310 and fed to interpolator 312, and the same sample should be fed to delay buffer 320. In the case of underflow, whatever strategy is used to provide data to interpolator 312 should be used to feed delay buffer 320. For example, interpolator 312 may simply repeat the last read from DAC FIFO 310 in the case of underflow and if so this value should be written to delay buffer 320. Moreover if DAC FIFO 310 provides zeroes to interpolator 312 on underflow, then it should also provide zeroes to delay buffer 320, or if DAC FIFO 310 ramps the data to zero, then it should provide the same ramped signal to delay buffer 320.

By providing the same far-end speech signal to interpolator 312 and delay buffer 320 to a remote functional circuit, for example, a processor circuit, and by further providing a return path speech signal based on the far-end speech signal, the acoustic echo canceller maintains convergence based on synchronized near-end and far-end signals.

Figure 4:
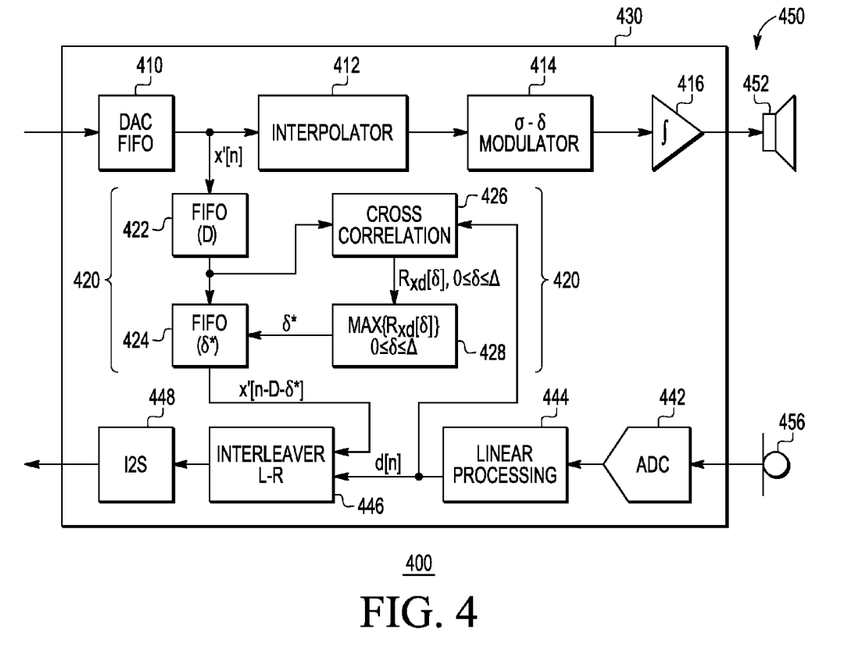
FIG. 4 illustrates in partial block diagram and partial schematic form a portion of the integrated circuit audio hub of FIG. 2 according to another embodiment.

FIG. 4 illustrates in partial block diagram and partial schematic form an integrated circuit audio hub 430 that may be used to implement a portion of integrated circuit audio hub 230 of FIG. 2 according to another embodiment. FIG. 4 shows integrated circuit audio hub 430 in the context of an audio processor system that includes a set of electroacoustic transducers 450.

Integrated circuit audio hub 430 includes a FIFO buffer 410 (DAC FIFO), an interpolator 412, a delta-sigma (σ-δ) modulator 414, a filter (∫) 416, a delay buffer 420, an analog-to-digital converter 442, a digital signal processing circuit 444 (LINEAR PROCESSING), an interleaver 446 labeled "INTERLEAVER L-R" to provide left and right channels of a stereo signal, and a serial interface circuit 448. In the illustrated embodiment, the inter-chip digital link and serial interface circuit 448 are compatible with the 12 S standard, but in other embodiments any other suitable digital link may be used.

FIFO buffer 410 has an input connected to the output of digital signal processing circuit 236 (see FIG. 2), and an output to provide signal x'[n]. Interpolator 412 has an input connected to the output of FIFO buffer 410 to receive signal x'[n], and an output. Delta-sigma modulator 414 has an input connected to the output of interpolator 412, and an output. Filter 416 has an input connected to the output of delta-sigma modulator 414, and an output to provide an analog speech signal.

Delay buffer 420 includes a FIFO buffer 422 labeled "FIFO (D)", a FIFO buffer 424 labeled "FIFO (δ*)", a cross correlation calculator 426, and a determination block 428 labeled "MAX $\{R_{xd}[\delta]\}$ $0 \le \delta \le \Delta$". FIFO buffer 422 has an input connected to the output of FIFO buffer 410 and an output. FIFO buffer 424 has a first input connected to the output of FIFO buffer 422, a second input to receive a signal labeled "δ*", and an output to provide a signal labeled "x'[n–D–δ*]". Cross correlation calculator 426 has a first input connected to the output of FIFO buffer 422, a second input to receive signal d[n], and an output to provide a signal labeled "$R_{xd}[\delta]$, $0 \le \delta \le \Delta$". Determination block 428 has an input connected to the output of cross correlation calculator 426 to receive signal $R_{xd}[\delta]$, $0 \le \delta \le \Delta$, and an output connected to the input of FIFO buffer 424 to provide signal δ*.

Analog-to-digital converter 442 has an input to receive a near-end speech signal and an output to provide a digital near-end speech signal. Digital signal processing circuit 444 has an input connected to the output of analog-to-digital converter 442 to receive the digital near-end speech signal, and an output connected to the second input of cross correlation calculator 426 to provide signal d[n]. Interleaver 446 has a first input connected to the output of FIFO buffer 424 to receive signal x'[n–D–δ*], a second input connected to the output of digital signal processing circuit 444 to receive signal d[n], and an output port to alternatively provide signals x'[n–D–δ*] and d[n]. Serial interface circuit 448 has an input connected to the output of interleaver 446, and an output. In one embodiment, the output of serial interface circuit 448 is connected to at least one external output terminal.

The set of electroacoustic transducers 450 includes a loudspeaker 452 and a microphone 456. Loudspeaker 452 has an input connected to the output of filter 416 to receive the analog speech signal, and provides sound in response to its input. Microphone 456 has an output connected to the input of analog-to-digital converter 442 to provide an analog speech signal in response to received sound.

In operation, delay buffer 420 performs gross time alignment to synchronize the far-end and near-end signal samples to the nearest sample. FIFO buffer 422 provides a fixed delay D and FIFO buffer 424 provides a variable delay δ* provided by determination block 428. Cross correlation calculator 426 compares the delayed far-end signal x'[n–D] and the near-end signal d[n] and calculates cross correlations for a multiple number of delays, from 0 up to a practical maximum number of delays Δ. Determination block 428 provides control signal δ* corresponding to the delay at the peak of the cross correlations, and FIFO buffer 424 outputs signal x'[n–D–δ*] during the same sample period that DAC FIFO buffer 410 outputs signal x'[n]. Interleaver 446 interleaves signal x'[n–D–δ*] and signal d[n] on the left and right time slots, respectively, which serial interface circuit 448 provides to an output port of integrated circuit audio hub 430.

Thus, delay buffer 420 is able to dynamically compute a delay with an accuracy of less than about one sample period to align the delayed far-end signal and the near-end signal. By dynamically computing the delay, integrated circuit audio hub 430 allows the acoustic echo canceller to better cancel acoustic echo caused by the far-end signal during changing operating conditions.

Figure 5:
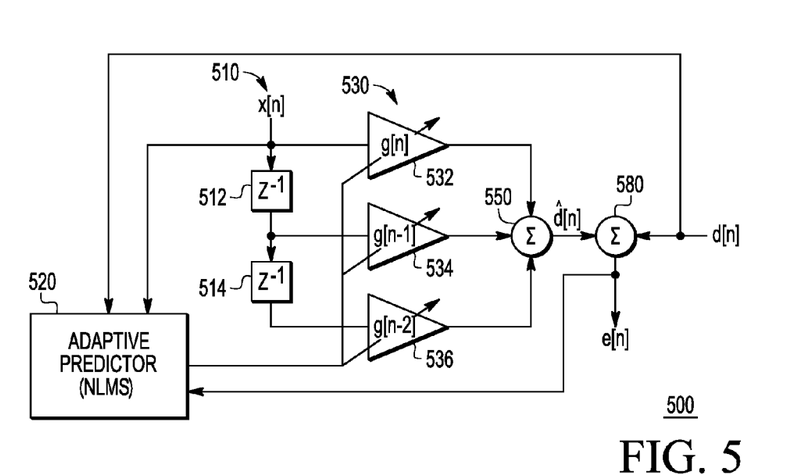
FIG. 5 illustrates in block diagram form an adaptive finite impulse response (FIR) filter that may be used in the integrated circuit audio hub of FIG. 3.

FIG. 5 illustrates in block diagram form an adaptive FIR filter 500 that may be used in integrated circuit audio hub 330 of FIG. 3. Adaptive FIR filter 500 generally includes a set of sample delay elements 510 each labeled "$Z^{-1}$", an adaptive predictor 520, a set of variable multipliers 530, a summing device 550, and a summing device 580. In one embodiment, adaptive predictor 520 is based on a normalized least mean squares (NLMS) algorithm. For the example shown FIG. 3, adaptive FIR filter 500 (not shown) has an input connected to the output of digital signal processing circuit 344 to receive signal d[n], an input connected to the output of delay buffer 320 to receive signal x'[n], and an output connected to the second input of interleaver 346 to provide the error signal e[n] in place of signal d[n].

The set of sample delay elements 510 includes a sample delay element 512 and a sample delay element 514. Sample delay element 512 has an input to receive signal x[n] that is a first filter tap signal, and an output to provide a second filter tap signal. Sample delay element 514 has an input connected to the output of sample delay element 512 to receive the second filter tap signal, and an output to provide a third filter tap signal.

Adaptive predictor 520 has a first input to receive signal d[n], a second input to receive signal x[n], a third input to receive signal e[n], and an output to provide a set of filter coefficients.

The set of variable multipliers 530 includes a variable multiplier 532 labeled "g[n]", a variable multiplier 534 labeled "g[n–1]", and a variable multiplier 536 labeled "g[n–2]". Variable multiplier 532 has a first input to receive signal x[n], a second input connected to the output of adaptive predictor 520 to receive a corresponding coefficient, and an output. Variable multiplier 534 has a first input connected to the output of sample delay element 512 to receive the second filter tap signal, a second input connected to the output of adaptive predictor 520 to receive a corresponding coefficient, and an output. Variable multiplier 536 has a first input connected to the output of sample delay element 514 to receive the third filter tap signal, a second input connected to the output of adaptive predictor 520 to receive a corresponding coefficient, and an output.

Summing device 550 has a first input connected to the output of variable multiplier 532, a second input connected to the output of variable multiplier 534, a third input connected to the output of variable multiplier 536, and an output to provide signal d̂[n]. Summing device 580 has a first input connected to the output of summing device 550, a second input to receive signal d[n], and an output to provide signal e[n] that represents the difference between signal d[n] and signal d̂[n].

In operation, an audio hub that uses both gross time alignment (discussed above) and fine time alignment (to be discussed below) can use adaptive FIR filter 500 to cancel the dominant path with only a small number of filter tap signals. Adaptive predictor 520 updates the filter tap signals of the set of variable filters 530 based on the NLMS algorithm:

$$\bar{h}[n] = \bar{h}[n-1] - \mu \cdot e[n] \cdot \bar{x}[n]/\|\bar{x}[n]\| \quad [3]$$

where μ is a step size, and $\|\bar{x}[n]\|$ means the magnitude of $\bar{x}[n]$, which is equal to $\bar{x}^T[n] \cdot \bar{x}[n]$, and in which T represents the vector transpose operator. Note that other adaptive algorithms may be employed to update the tap gains such as Affine Projection (AP), Fast Affine Projection (FAP), Kalman Filter, etc.

Figure 6:
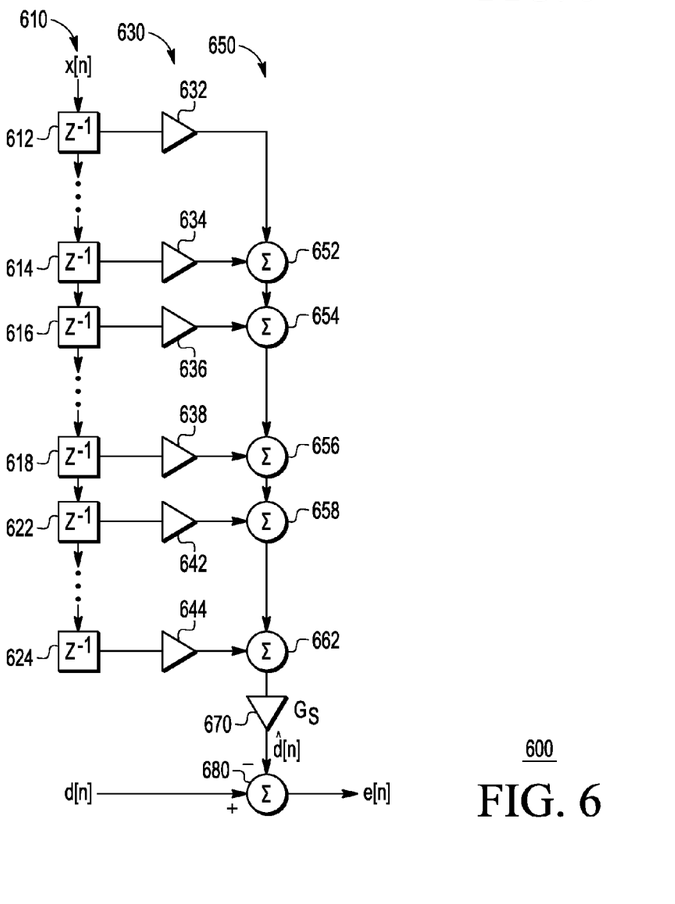
FIG. 6 illustrates in block diagram form a portion of an adaptive FIR filter that may be used in the Bluetooth/Core module of FIG. 2.

FIG. 6 illustrates in block diagram form a portion of an adaptive FIR filter 600 that may be used in Bluetooth/core module 210 of FIG. 2. Adaptive FIR filter 600 performs adaptive scaling to enable matching of an echo level. Adaptive FIR filter 600 generally includes a set of sample delay elements 610 each labeled "Z⁻¹", a set of multipliers 630, a set of summing devices 650, a multiplier 670 labeled "$G_S$", and a summing device 680.

The set of sample delay elements 610 includes representative sample delay elements 612, 614, 616, 618, 622, and 624. Sample delay element 612 has an input to receive signal x[n], a first output to provide a first filter tap signal, and a second output. The set of sample delay devices 614-624 each have an input connected to the second output of a previous sample delay device, such that the set of sample delay devices 610 are connected to each other in a "chain" configuration, a first output to provide a filter tap signal, and a second output. Sample delay element 624 has an input connected to the second output of a previous sample delay element, and a first output to provide a last filter tap signal.

The set of multipliers 630 includes representative multipliers 632, 634, 636, 638, 642, and 644. Each one of the set of multipliers 630 has an input connected to a corresponding filter tap output, and an output.

The set of summing devices 650 includes representative summing devices 652, 654, 656, 658, and 662. Summing device 652 has a first input connected to the output of multiplier 632, a second input connected to the output of multiplier 634, and an output. The other representative summing devices 654-658 each have a first input connected to the output of a previous summing device, a second input connected to an output of a corresponding multiplier, and an output, such that the set of summing devices 650 are connected to each other in a chain configuration. Summing device 662 has a first input connected to the output of summing device 658, a second input connected to the output of filter 644, and an output. Multiplier 670 has an input connected to the output of summing device 662, and an output to provide signal $\hat{d}$[n]. Summing device 680 has a positive input to receive signal d[n], a negative input connected to the output of filter 670 to receive signal $\hat{d}$[n], and an output to provide error signal e[n] that represents the difference between signal d[n] and signal $\hat{d}$[n].

In operation, adaptive FIR filter 600 includes multiplier 670 to adjust to changes in the overall gain. A problem with echo cancellation is that any time the volume is adjusted on the output or an analog gain is changed on an input, the echo canceller leaves its converged state. Until the echo canceller converges again to the changed signal level, echo is injected into the near-end speech signal instead of being cancelled from the near-end speech signal.

Circuitry in the ADC 242 and DAC 238 reflects the gain change, even if it is made through a sequence of small gain steps. However this gain change information is generally not available to the digital signal processing circuitry on the integrated circuit audio hub and is unknown by a remote processor. One possible solution is to compensate the near-end signal for these gain changes before outputting it to the echo canceller. However AGC in the far- and near-end speech signals already operates to scale their respective signals to the full dynamic range of the digital signal processing circuits. Thus if gain is decreased and the signal is scaled to keep the echo canceller in a converged state, the compensating gain may saturate the digital signal, which would effectively disconnect the AGC circuitry.

To overcome this problem, adaptive FIR filter 600 processes a wide range of relative signal levels for both the far-end and the near-end signals, signals x'[n] and d[n] respectively, and then applies a global gain. In some cases, the acoustic echo may be larger than signal d[n], in which case adaptive FIR filter 600 will produce gains greater than unity. In other cases, the acoustic echo may be smaller than signal d[n], in which case adaptive FIR filter 600 will produce smaller gains. Since the ability of adaptive FIR filter 600 to cancel the echo is a function of the quantization noise in the filter gains, higher performance is achieved when adaptive FIR filter 600 is implemented with scaling such that the coefficients can be "full scale", but the output is scaled up or down using multiplier 670 to match the echo level signal $\hat{d}$[n]. Various algorithms can be used to modify and adjust the value of the output gain, but filter 600 reflects both the nominal gain and any gain change ("ΔG") in multiplier 670. Periodically, the adaptive predictor (not shown in FIG. 6) will adjust the relative scaling between the individual tap coefficients and $G_S$ to increase the precision of $\hat{d}$[n]. A technique for transferring the gain information between an integrated circuit audio hub and a remote processor will now be described.

Figure 7:
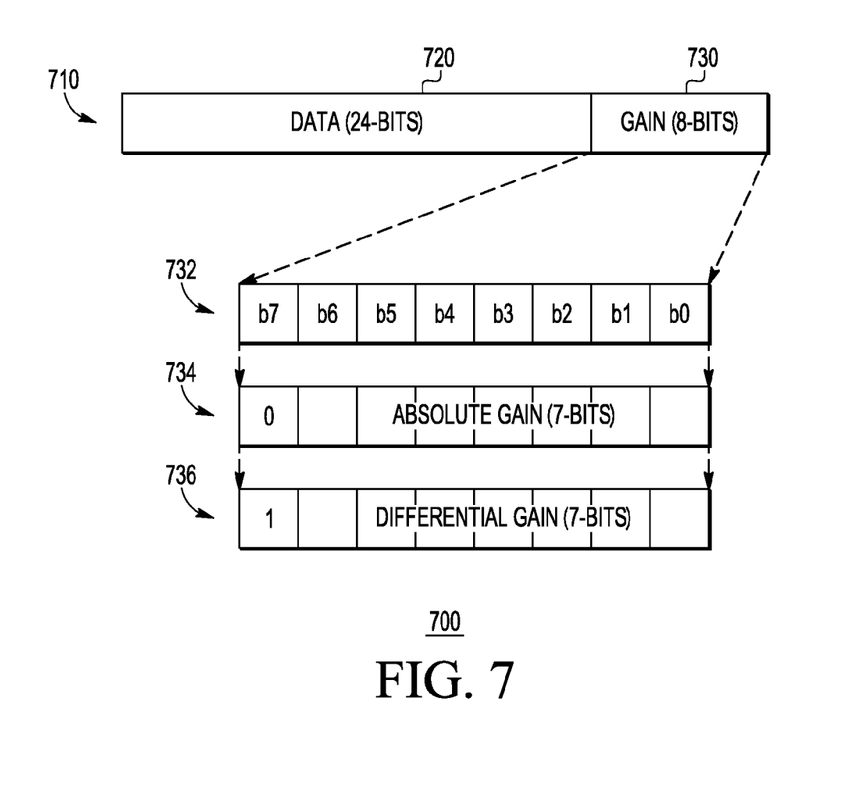
FIG. 7 illustrates a representation of a set of data words that may be used by the integrated circuit audio hub of FIG. 2.

FIG. 7 illustrates a representation of a set of data words 700 that may be used by integrated circuit audio hub 230 of FIG. 2. Each one of the set of data words 700 generally includes a data word 710. Data word 710 includes a twenty-four bit data field 720 representing a sample value and an eight-bit gain field 730. Gain field 730 is represented by a gain field encoding 732 having eight bits labeled "b7" through b0". Gain field encoding 732 may encode an absolute gain 734 in which bit b7 is set to binary 0 and bits b6-b0 represent the absolute gain, or a differential gain 736 in which b7 is set to binary 1 and bits b6-b0 represent the differential gain.

In operation, an interleaver such as interleaver 246 of FIG. 2 combines the gain indication in a selected format represented by data word 700 with the value of the near-end signal for use by the acoustic echo canceller in Bluetooth/core module 210. Integrated circuit audio hub 230 synchronizes gain changes in DAC 238 and ADC 242 with each Nyquist sample on ADC 242 to localize the effects of the gain change to a single sample at the point of transition. For each sample of ADC 242, the net path gain applied to that sample is concatenated with the sample. For example if ADC 242 uses a FIFO at its output, this concatenation will occur when the sample is written to the FIFO. The acoustic echo canceller separates the gains from the samples and uses the gain bits to adjust the scaling of the predictor filter, as shown in FIG. 6 above.

By providing the gain information along with the near end speech samples, integrated circuit audio hub 230 allows the echo canceller in Bluetooth/core module 210 to adjust to gain changes without losing convergence and inserting (rather than cancelling) echo. Moreover by providing the gain information as a differential gain, integrated circuit audio hub 230 is able to more precisely represent small gain changes when a discrete gain change is implemented in a series of smaller steps.

Figure 8:
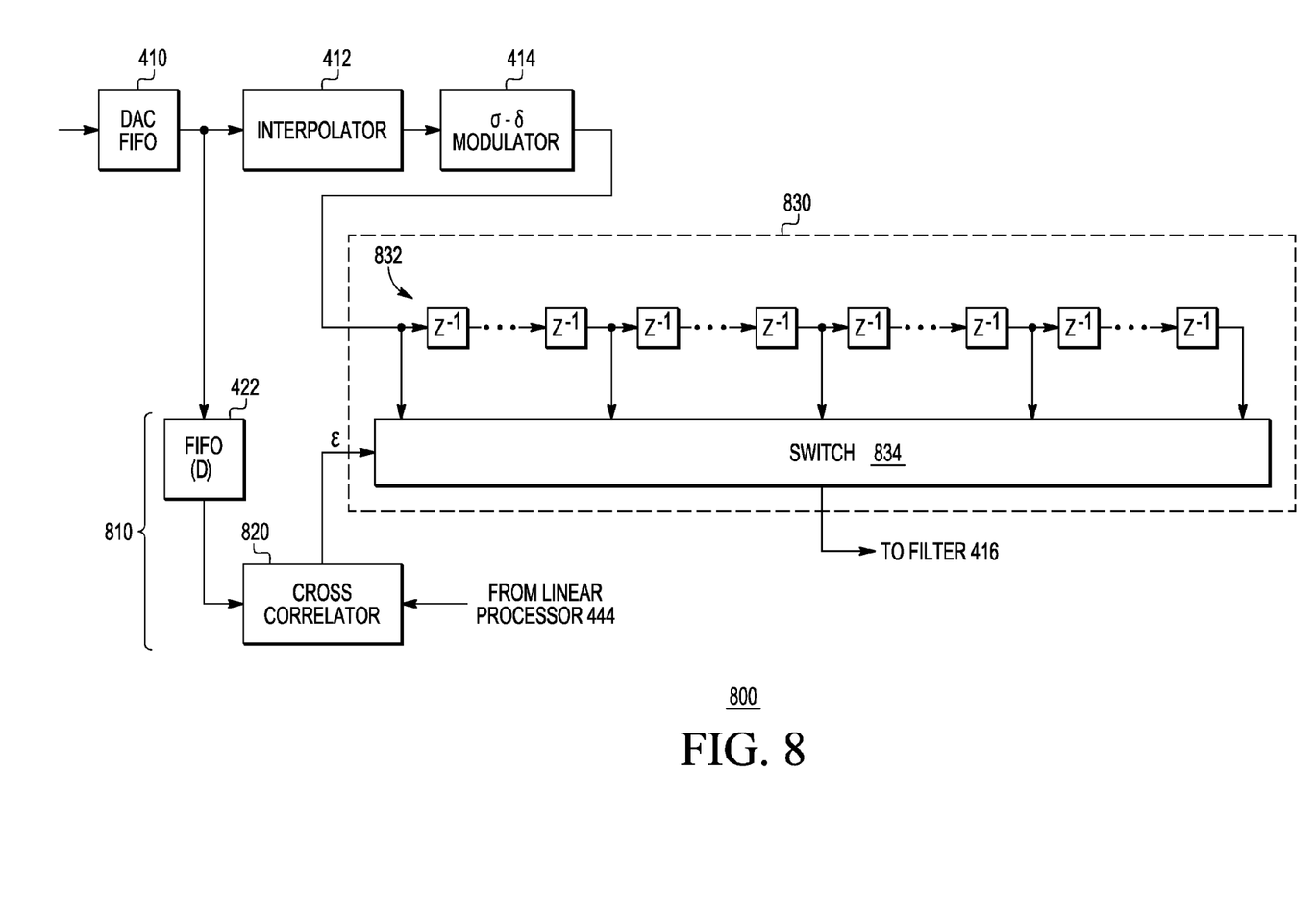
FIG. 8 illustrates in block diagram form a portion of an integrated circuit audio hub according to another embodiment.

FIG. 8 illustrates in block diagram form a portion of an integrated circuit audio hub 800 according to another embodiment. Integrated circuit audio hub 800 generally includes FIFO buffer 410, interpolator 412, delta-sigma modulator 414, as previously illustrated in FIG. 4 above, as well as a cross correlation calculator 810, and a fractional delay buffer 830.

Cross correlation calculator 810 includes FIFO buffer 422 as previously illustrated in FIG. 4 above and a cross correlator 820. Cross correlator 820 has a first input connected to the output of FIFO buffer 422, a second input connected to the output of digital signal processing circuit 444, and an output to provide a fractional delay signal labeled "ϵ".

Fractional delay buffer 830 includes a set of sample delay elements 832 each one labeled "Z⁻¹", and a switch 834. The first sample delay element has an input connected to the output of delta-sigma modulator 414, and an output to provide a filter tap signal. Each one of the set of sample delay element 832 has an input connected to the output of a previous sample delay element, such that the set of sample delay devices 832 are connected to each other in a chain configuration, and an output to provide a filter tap signal. Switch 834 has a set of signal inputs connected to the output of σ-δ modulator 414 and to the output of each delay element, a control input connected to the output of cross correlator 820 to receive the fractional delay signal ε, and an output connected to the input of filter 416.

In operation, cross correlator 820 provides fractional delay signal ε to switch 834 and estimates the instantaneous fractional delay, δ, between the signal output from FIFO 422 and the output of linear processor 444. Cross correlator 820 will increase or decrease ε until the measured delay, δ, is approximately zero. Integrated circuit audio hub 800 aligns fractional delay signal ε in the dominant acoustic echo path, where fractional delay signal ε has a period less than one sample period and has a transfer function:

$$H(e^{j\omega}) = e^{-j\omega\epsilon};\qquad [6]$$

where the frequency response is defined at a given frequency, ω.

Fractional delay buffer 830 delays the bit stream output of delta-sigma modulator 414 by a fraction of a sample period n. For example, at an over-sampling rate of 6 megabits per second (Mb/s), one sample period at 8 kilo-samples per second (kS/s) is equivalent to delta-sigma modulator 414 providing 750 bits in the modulated stream. Delta-sigma modulator 414 provides the over-sampled 1-bit signal to sample delay element 832 that, for this example, is at least 750 bits long. Cross correlation calculator 810 calculates the effective length of sample delay element 832 and programs the filter tap signals based on fractional delay signal ε in increments of, for example, a fraction of a Nyquist sample (e.g., every 75 bits for a granularity of one-tenth of a Nyquist sample).

Thus integrated circuit audio hub 800 takes advantage of the oversampled characteristic of a σ-δ modulator to increase the granularity of the alignment of the near-end and delayed far-end signals to a small fraction of a Nyquist sample.

Figure 9:
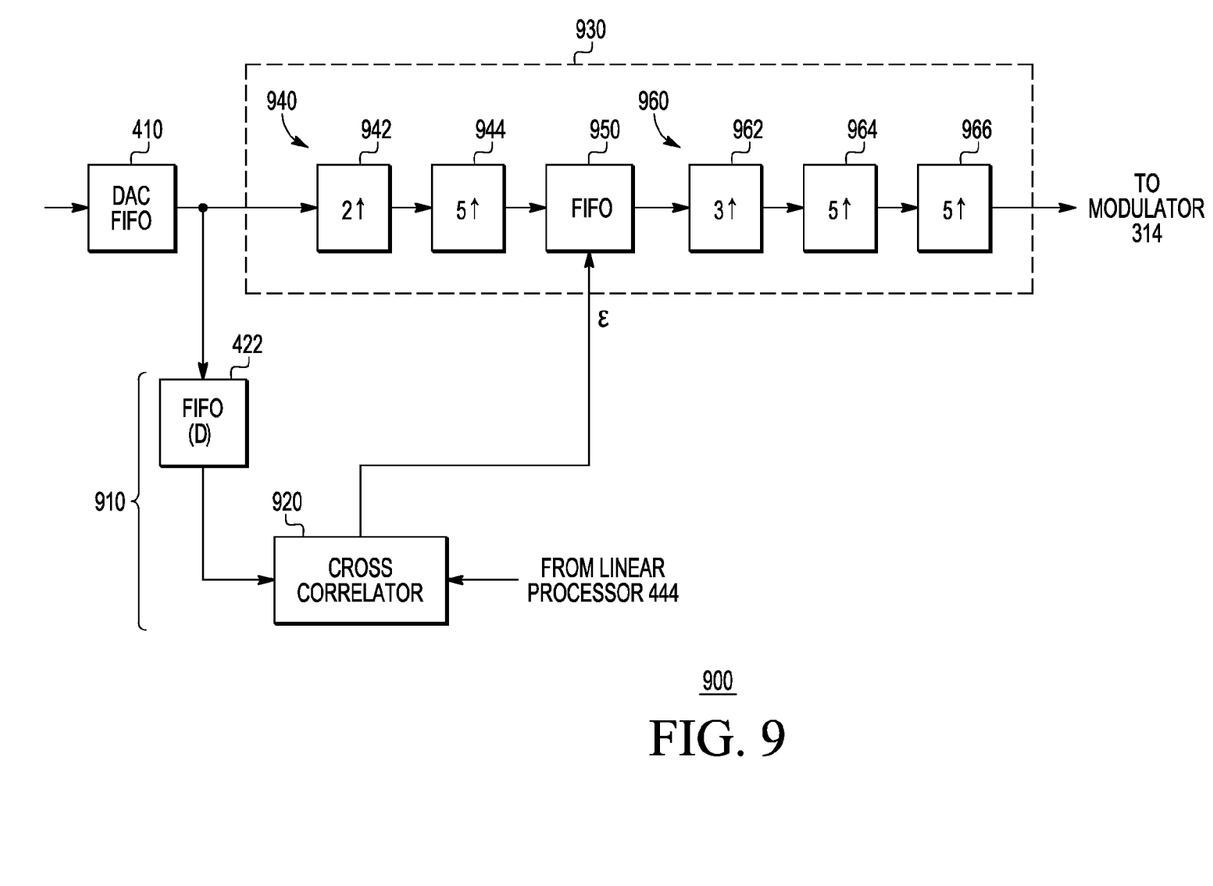
FIG. 9 illustrates in block diagram form a portion of an integrated circuit audio hub according to another embodiment.

FIG. 9 illustrates in block diagram form a portion of an integrated circuit audio hub 900 according to another embodiment. Integrated circuit audio hub 900 generally includes FIFO buffer 410, a cross correlation calculator 910, and an interpolator 930. FIFO buffer 410 has an output to provide signal x'[n] (see FIG. 4).

Cross correlation calculator 910 includes FIFO buffer 422 as previously illustrated in FIG. 4 above and a cross correlator 920. FIFO buffer 422 has an input connected to the output of FIFO buffer 410 to receive signal x'[n], and an output. Cross correlator 920 has a first input connected to the output of FIFO buffer 422, a second input connected to the output of digital signal processing circuit 444, and an output to provide a fractional delay signal labeled "ε".

Interpolator 930 includes an upsampling circuit 940, a FIFO buffer 950, and an upsampling circuit 960. Upsampling circuit 940 includes an upsampler 942 labeled "2↑" and an upsampler 944 labeled "5↑". Upsampler 942 has an input connected to the output of FIFO buffer 410 to receive signal x'[n], and an output. Upsampler 944 has an input connected to the output of upsampler 942, and an output.

FIFO buffer 950 has a first input connected to the output of upsampler 944, a second input connected to the output of cross correlator 920 to receive fractional delay signal ε, and an output.

Upsampler 960 includes an upsampler 962 labeled "3↑", an upsampler 964 labeled "5↑", and an upsampler 966 labeled "5↑". Upsampler 962 has an input connected to the output of FIFO buffer 950, and an output. Upsampler 964 has an input connected to the output of upsampling bit 962, and an output. Upsampler 966 has an input connected to the output of upsampler 964, and an output connected to the input of delta-sigma modulator 314 (see FIG. 3).

In operation, integrated circuit audio hub 900 aligns the far-end and near-end speech signals by a fraction of a delay period using the interpolator in the analog-to-digital converter. Cross correlator 920 provides fractional delay signal ε to variable length FIFO buffer 950. If, as shown in the example in FIG. 9, integrated circuit audio hub 900 targets a granularity of one-tenth of a Nyquist sample, upsampling circuit 940 upsamples the output signals of FIFO buffer 410 by factors of 2 and 5, respectively. Also, cross correlator 920 provides fractional delay signal ε to FIFO buffer 950, where FIFO buffer 950 has a depth of no more than 10 units of delay. FIFO buffer 950 provides its output to upsampling circuit 960 to upsample the output signals of FIFO buffer 950 by factors of 3, 5, and 5, respectively. Upsampling circuit 960 also provides its upsampled output signal to delta-sigma modulator 314.

By providing the fractional delay signal ε to a variable length FIFO buffer 950 of interpolator 930, where interpolator 930 includes upsampling circuit 940 on the input side of FIFO buffer 950 and upsampling circuit 960 on the output side of a variable length FIFO buffer 950, integrated circuit audio hub 900 aligns fractional delay signal ε in the dominant acoustic echo path. Integrated circuit audio hub 900 also achieves a granularity of a small fraction of a Nyquist sample.

Thus integrated circuit audio hub 230 returns a delayed version of the far-end speech signal, i.e. x'[n], for use in the acoustic echo canceller in Bluetooth/Core module 210 instead of the original far-end signal x[n] transmitted to integrated circuit audio hub 230 to provide more accurate echo cancellation. According to some embodiments, integrated circuit audio hub 230 provides adaptive gross and fine delay adjustment so that the returned far-end signal is accurately synchronized with the near-end signal. Moreover in some embodiments, integrated circuit audio hub also provides gain information along with the near-end samples so that the off-chip acoustic echo canceller can avoid losing convergence after a gain change.

The circuits illustrated in FIGS. 2-6, 8, and 9 contributes to providing improved, effective acoustic echo canceling, taking into consideration:

1. Buffer and transfer delay injected in the far-end speech path after summing device 222 provides signal e[n] to adaptation control block 216;
2. ADC 242 and DAC 238 processing the far-end speech signal (for example, performing equalization and volume control) after summing device 222 provides signal e[n] to adaptation control block 216;
3. Additional delay injected in the near-end speech signal d[n] before providing signal d[n] to summing device 222;
4. Volume or AGC changes; and
5. Alignment of the near-end and far-end speech signals in the acoustic echo canceller.

In other embodiments, the circuits of FIGS. 2-9, for example, audio processor system 200, Bluetooth/Core module 210, integrated circuit audio hubs 230, 330 and 430, adaptive FIR filters 500 and 600, cross correlation calculator 820, fractional delay buffers 830 and 910, and interpolator 930, could be implemented by various combinations of hardware, or by software or firmware running on a data processor and with one or more off-chip components. In other embodiments, the functions of FIGS. 2-9 could be formed on a single integrated circuit or could be formed on multiple integrated circuits using any different number of integrated circuit combinations. For example, digital signal processing circuits 234 and 236, digital-to-analog converter 238, analog-to-digital converter 242, digital signal processing circuit 244, and interleaver 246 could be combined on a single integrated circuit. Also, the functions of integrated circuit audio hub 230 and the functions of Bluetooth/Core module 210 could be further combined on a single integrated circuit chip.

Also, in FIGS. 2-9, audio signals have been described in the context of speech signals, but in other embodiments the audio signals could be other types of audio signals, for example, an audio signal provided by a musical instrument.

The above-disclosed subject matter is to be considered illustrative, and not restrictive, and the appended claims are intended to cover all such modifications, enhancements, and other embodiments that fall within the true scope of the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. An audio processor circuit comprising:
   a first digital signal processing circuit having an input for receiving a far-end audio signal, and an output;
   a second digital signal processing circuit having an input for receiving a digital near-end audio signal, and an output;
   a delay buffer having an input coupled to said output of said first digital signal processing circuit, and an output, a delay of said delay buffer synchronizing said output of said first digital signal processing circuit to said output of said second digital signal processing circuit; and
   an interleaver having a first input coupled to said output of said delay buffer, a second input coupled to said output of said second digital signal processing circuit, and an output for alternatively providing signals received from said first and second inputs to said output.

2. The audio processor circuit of claim 1 wherein said first digital signal processing circuit, said second digital signal processing circuit, and said interleaver are combined on a single integrated circuit chip.

3. The audio processor circuit of claim 2 wherein said single integrated circuit chip further comprises:
   a digital-to-analog converter having an input coupled to said output of said first digital signal processing circuit, and an output for providing an analog audio signal; and
   an analog-to-digital converter having an input for receiving a near-end audio signal, and an output for providing said digital near-end audio signal.

4. The audio processor circuit of claim 3, wherein:
   said delay of said delay buffer is approximately equal to a sum of a path delay through said digital-to-analog converter, a first attack echo path delay, a path delay through said analog-to-digital converter, and a path delay through said second digital signal processing circuit.

5. The audio processor circuit of claim 2 wherein said single integrated circuit chip further comprises:
   a first serial interface circuit having an input coupled to at least one external input terminal, and an output coupled to said input of said first digital signal processing circuit; and
   a second serial interface circuit having an input coupled to said output of said interleaver, and an output coupled to at least one external output terminal.

6. The audio processor circuit of claim 5, wherein said first and second serial interface circuits are compliant with the Inter-IC Sound standard.

7. The audio processor circuit of claim 5, further comprising:
   a third serial interface circuit having an input coupled to said output of said second serial interface circuit, a first output for providing said output of said first digital signal processing circuit, and a second output for providing said output of said second digital signal processing circuit; and
   an echo canceller having an input coupled to said output of said third serial interface circuit, and an output for providing an echo cancelled near-end audio signal.

8. The audio processor circuit of claim 7, wherein said echo canceller comprises:
   a summing device having a positive input coupled to said first output of said third serial interface circuit, a negative input, and an output for providing said echo cancelled near-end audio signal;
   a tapped delay line having a signal input coupled to said first output of said third serial interface circuit, a coefficient input, and a signal output coupled to said negative input of said summing device; and
   an adaptation control block having first and second inputs respectively coupled to said first and second outputs of said third serial interface circuit, a third input for receiving said far-end audio signal, a fourth input coupled to said output of said summing device, and an output coupled to said coefficient input of said tapped delay line.

9. The audio processor circuit of claim 7, wherein said third serial interface circuit and said echo canceller are combined on a second integrated circuit chip.

10. The audio processor circuit of claim 1, wherein said first digital processing circuit has a last stage comprising a first-in, first-out buffer, and wherein said delay buffer has an input coupled to an output of said first-in, first-out buffer.

11. The audio processor circuit of claim 1, wherein said delay buffer comprises:
    a first first-in, first-out (FIFO) buffer having an input coupled to said output of said first digital signal processing circuit, and an output, and providing a programmable delay;
    a second FIFO buffer having a signal input coupled to said output of said first FIFO buffer, a control input, and an output, for providing a variable delay determined by said control input;
    a cross correlation calculator having a first input coupled to said output of said first FIFO buffer, a second input coupled to said output of said second digital signal processing circuit, and an output for providing cross correlations for a plurality of delays; and
    a determination block having an input coupled to said output of said cross correlation calculator and an output coupled to said control input of said second FIFO buffer, for providing said control input corresponding to a delay at a peak of said cross correlations.

12. The audio processor circuit of claim 1, wherein:
    said delay buffer further has an input coupled to said output of said second digital signal processing circuit, and an output for providing a fractional delay value; and
    the audio processor circuit further comprises a digital-to-analog converter having an input coupled to said output of said delay buffer, and an output for providing an analog audio signal, wherein said digital-to-analog converter provides a fractional delay in said analog audio signal in response to said fractional delay value.

13. The audio processor circuit of claim 12, wherein said delay buffer comprises:

a first first-in, first-out (FIFO) buffer having an input coupled to said output of said first digital signal processing circuit, and an output, and providing a fixed delay; and a cross correlation calculator having a first input coupled to said output of said first FIFO buffer, a second input coupled to said output of said second digital signal processing circuit, and an output for providing said fractional delay value.

14. The audio processor circuit of claim 13, wherein said digital-to-analog converter comprises:

an interpolator having an input forming said input of said digital-to-analog converter, and an output;

a delta-sigma modulator having an input coupled to said output of said interpolator, and an output;

a fractional delay buffer having a first input coupled to said output of said delta-sigma modulator, a second input coupled to said output of said cross correlation calculator, and an output; and a filter having an input coupled to said output of said fractional delay buffer, and an output for providing said analog audio signal.

15. The audio processor circuit of claim 14, wherein said fractional delay buffer comprises:

a plurality of delay elements coupled in a chain; and a switch responsive to said fractional delay value for selecting an output from among said plurality of delay elements to provide as said output of said fractional delay buffer.

16. The audio processor circuit of claim 13, wherein said digital-to-analog converter comprises:

an interpolator having a first input forming said input of said digital-to-analog converter, a second input for receiving said fractional delay value, and an output;

a delta-sigma modulator having an input coupled to said output of said interpolator, and an output a fractional delay buffer having a first input coupled to said output of said delta-sigma modulator, a second input coupled to said output of said cross correlation calculator, and an output; and a filter having an input coupled to said output of said fractional delay buffer, and an output for providing said analog audio signal.

17. The audio processor circuit of claim 16, wherein said interpolator comprises:

a first upsampling circuit having an input forming said input of said interpolator, and an output;

a first-in, first-out buffer having an input coupled to said output of said first upsampling circuit, a control input for receiving said fractional delay value, and an output; and a second upsampling circuit having an input coupled to said output of said first-in, first-out buffer, and an output forming said output of said interpolator.

18. An audio processor circuit comprising:

a first signal processing circuit having an input for receiving a far-end signal, and an output, and changing said far-end signal according to a first gain;

a second signal processing circuit having an input for receiving a near-end signal, and an output, and changing said near-end signal according to a second gain; and an interleaver having a first input coupled to said output of said first signal processing circuit, a second input coupled to said output of said second signal processing circuit, and an output, for alternatively providing signals received from said first and second inputs to said output, and further concatenating at least one of said first and second signals with a gain indication representing a path gain of said first and second inputs.

19. The audio processor circuit of claim 18, wherein said interleaver forms said gain indication in a selected format.

20. The audio processor circuit of claim 19, wherein said selected format comprises one of as one of an absolute gain and a differential gain.

21. The audio processor circuit of claim 18, wherein said gain indication comprises a plurality of bits including a format bit.

22. A method comprising:

processing a far-end audio signal to form a first digital signal;

processing a near-end audio signal to form a second digital signal;

delaying said first digital signal to form a delayed first digital signal, wherein said delaying synchronizes said delayed first digital signal to said second digital signal; and alternatively providing said delayed first digital signal and said second digital signal to an output port.

23. The method of claim 22 further comprising:

converting said first digital signal to an analog audio signal.

24. The method of claim 22 wherein said processing said near-end audio signal digitally to form said second digital signal comprises:

converting said near-end audio signal to said second digital signal.

25. The method of claim 22 further comprising:

delaying said second digital signal using a delay buffer.

26. The method of claim 25 further comprising:

calculating a plurality of cross correlations between said first digital signal and said second digital signal;

determining a peak of said plurality of cross correlations; and varying a delay of said delay buffer in response to said peak of said plurality of cross correlations.

* * * * *